US011481667B2

(12) United States Patent
Raz et al.

(10) Patent No.: US 11,481,667 B2
(45) Date of Patent: Oct. 25, 2022

(54) CLASSIFIER CONFIDENCE AS A MEANS FOR IDENTIFYING DATA DRIFT

(71) Applicant: International Business Machines Corporation, Armonk, NY (US)

(72) Inventors: Orna Raz, Haifa (IL); Marcel Zalmanovici, Kiriat Motzkin (IL); Aviad Zlotnick, Mitzpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 16/255,885

(22) Filed: Jan. 24, 2019

(65) Prior Publication Data

US 2020/0242505 A1 Jul. 30, 2020

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC ............................... G06N 20/00; G06F 16/285
See application file for complete search history.

(56) References Cited

U.S. PATENT DOCUMENTS

| | | | | |
|---|---|---|---|---|
| 7,970,718 B2 * | 6/2011 | Guyon | ................... | G06N 20/10 706/15 |
| 8,417,648 B2 * | 4/2013 | Hido | ...................... | G06K 9/623 706/20 |
| 9,245,226 B2 * | 1/2016 | Wolff | ...................... | G06N 20/00 |
| 9,542,646 B1 * | 1/2017 | Baughman | .............. | G06N 20/00 |
| 9,760,834 B2 * | 9/2017 | Chae | ...................... | G06N 20/00 |
| 10,410,135 B2 * | 9/2019 | Shumpert | .............. | G06N 20/00 |
| 10,546,237 B2 * | 1/2020 | Heifets | ................... | G16B 40/00 |
| 2008/0033899 A1 * | 2/2008 | Barnhill | ................. | G16B 40/20 706/48 |
| 2016/0321542 A1 * | 11/2016 | Towal | ................... | G06N 3/088 |
| 2017/0255874 A1 * | 9/2017 | Chafle | ................. | G06F 11/3452 |

(Continued)

FOREIGN PATENT DOCUMENTS

CN 103345575 7/2016

OTHER PUBLICATIONS

Grier, 2005.*

(Continued)

*Primary Examiner* — Michael I Ezewoko
(74) *Attorney, Agent, or Firm* — Gregory J. Kirsch

(57) ABSTRACT

Embodiments of the present systems and methods may provide improved machine learning performance even though data drift has occurred. For example, a method may comprise providing a machine learning model in a computer system, operating the machine learning model using a first dataset to obtain results of the first dataset, operating the machine learning model using a second dataset to obtain results of the second dataset, performing statistical testing on a confidence distribution of results of the first dataset and of results of the second dataset to determine a difference in a result confidence distribution between the first dataset and of the second dataset, and determining whether data included in the second dataset has data drift relative to the first dataset based on the difference in a result confidence distribution between the first dataset and of the second dataset.

9 Claims, 5 Drawing Sheets

(56) References Cited

U.S. PATENT DOCUMENTS

2017/0372232 A1    12/2017    Maughan et al.
2018/0074096 A1*    3/2018    Absher .................. G06N 20/00
2019/0279109 A1*    9/2019    Guelman .............. G06F 16/285

OTHER PUBLICATIONS

Edelman, 2008.*
Wirth, 1976.*
Dam, 2013.*
Goffman, 1974.*
Kuhn, 1962.*
Hayles, 2005.*
Lakoff, 1980.*
Mindell, 2015.*
Treffert, 2010.*
Costa, 2018.*
Bifet, 2007.*
Raza, 2015.*
Sobolewski, 2013.*
Krawczyk, 2017.*
Pundir, 2016.*
Cortes, 2011.*
Yange Sun et al., A Classifier Graph Based Recurring Concept Detection and Prediction Approach, Hindawi-Computational Intelligence and Neuroscience, 13 pages, vol. 2018.
Patrick Lindstrom et al., Drift Detection using Uncertainty Distribution Divergence, Dublin Institute of Technology ARROW@DIT, 2013, pp. 1-20, Evolving Systems, vol. 4, Dublin.

* cited by examiner

CLASSIFIER CONFIDENCE AS A MEANS FOR IDENTIFYING DATA DRIFT

BACKGROUND

The present invention relates to techniques for determining drift among data used by a machine learning model, such as data drift between a training dataset and a production dataset or between portions of a production dataset.

Classification tasks and other statistics-based machine learning (ML) techniques use the statistics of a training set to analyze production data. Often, the statistical characteristics of the data change between training time and production time, as well as throughout production. For example, sensors used to acquire data may lose sensitivity with time, populations may age, and fashion trends may change. These changes might affect the ML performance, such as lower a classifier accuracy below an anticipated threshold.

While many classification techniques either internally compute a measure of confidence in their results or expose it along with the classification to the user, this measure might not reflect the actual performance. A famous example is the Panda picture that is correctly classified as such with a confidence of about 60%, but when noise is added it is incorrectly classified as a Gibbon with a confidence of above 99%. (See, for example https://blog.openai.com/adversarial-example-research/).

Various existing approaches try to (1) improve the ML models to better handle changes in the data, or (2) identify data that is missing from the training examples. However, a need arises for techniques that may provide improved ML performance even though data drift has occurred.

SUMMARY

Embodiments of the present systems and methods may provide improved ML performance even though data drift has occurred. Embodiments may provide complementary approach that uses only the classifier itself and its confidence measure. For example, embodiments may identify data drift based on statistically significant changes to the distribution of a classifier confidence.

For example, in an embodiment, a method may comprise providing a machine learning model in a computer system comprising a processor, memory accessible by the processor, and computer program instructions stored in the memory and executable by the processor, operating, at the computer system, the machine learning model using a first dataset to obtain results of the first dataset, operating, at the computer system, the machine learning model using a second dataset to obtain results of the second dataset, performing, at the computer system, statistical testing on a confidence distribution of results of the first dataset and of results of the second dataset to determine a difference in a result confidence distribution between the first dataset and of the second dataset, and determining, at the computer system, whether data included in the second dataset has data drift relative to the first dataset based on the difference in a result confidence distribution between the first dataset and of the second dataset.

In embodiments, the first dataset may comprise at least a portion of a training dataset and the second dataset comprises as least a portion of a production dataset. The first dataset may comprise a first portion of a production dataset and the second dataset comprises a second portion of the production dataset. The machine learning model may be a classification model. The statistical testing may include a non-parametric statistical test for identity over the first dataset and the second dataset, over the classifier confidence distribution per each label. The statistical testing may include a non-parametric statistical test for identity over a first portion of the production dataset and a second portion of the production dataset, over the classifier confidence per each label determined to be of the class of an incoming data record per input data record.

In an embodiment, a system may comprise a processor, memory accessible by the processor, and computer program instructions stored in the memory and executable by the processor to perform: operating the machine learning model using a first dataset to obtain results of the first dataset, operating the machine learning model using a second dataset to obtain results of the second dataset, performing statistical testing on a confidence distribution of results of the first dataset and of results of the second dataset to determine a difference in a result confidence distribution between the first dataset and of the second dataset, and determining whether data included in the second dataset has data drift relative to the first dataset based on the difference in a result confidence distribution between the first dataset and of the second dataset.

In an embodiment, a computer program product may comprise a non-transitory computer readable storage having program instructions embodied therewith, the program instructions executable by a computer, to cause the computer to perform a method comprising: operating the machine learning model using a first dataset to obtain results of the first dataset, operating the machine learning model using a second dataset to obtain results of the second dataset, performing statistical testing on a confidence distribution of results of the first dataset and of results of the second dataset to determine a difference in a result confidence distribution between the first dataset and of the second dataset, and determining whether data included in the second dataset has data drift relative to the first dataset based on the difference in a result confidence distribution between the first dataset and of the second dataset.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments of the present systems and methods may provide improved ML performance even though data drift has occurred. Embodiments may provide complementary approach that uses only the classifier itself and its confidence measure. For example, embodiments may identify data drift based on statistically significant changes to the distribution of a classifier confidence.

We assume that if production class confidence values do not exhibit statistical similarity to training (or previously measured) class confidence values, there is reason to believe that the production data has deviated significantly from training data, and, therefore, classification results may be incorrect. In embodiments, the distribution of the classifier confidence per label may be utilized. For example, the confidence-per-label distribution in training and in production (or over two different time windows in production) may be compared. Likewise, for example, the classifier confidence distribution in the winning label may be compared. For example, a mixture of labels may be used where these labels were determined by the output of the classifier to be the class of an incoming data record, thus 'winning' for that data record among all possible classes.

Figure 1:
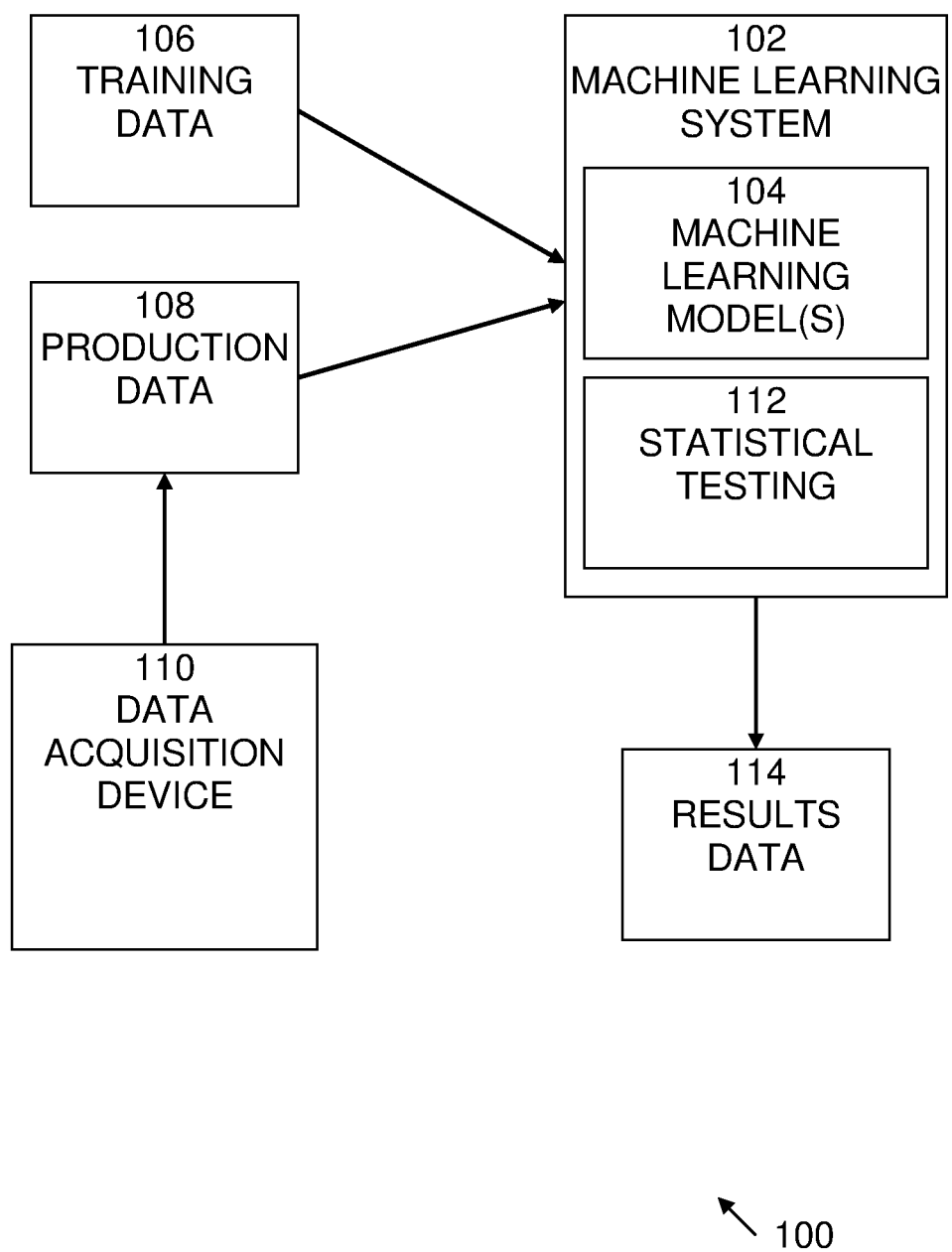
FIG. 1 illustrates an exemplary system in which the embodiments of the present systems and methods may be implemented.

An exemplary system 100 in which embodiments of the present systems and methods may be implemented is shown in FIG. 1. In this example, system 100 may include machine learning system 102, which may include machine learning model 104 and statistical testing 112, training data 106, production data 108, data acquisition device 110, and results data 114. Machine learning system 102 may be any computing device or combination of computing devices adapted to store, train, and operate machine learning model(s) 104. Machine learning model(s) 104 may be one or more arrangements of computing processes, statistical models, and data that may be trained using training data 106 to find patterns in, make predictions about, or make decisions about production data 108, without being programmed to perform such a task, or even without having any prior exposure to production data 108. For example, embodiments may utilize classification models, in which data is classified into one or more categories using the trained model(s).

Training data 106 is data that may be input to machine learning model(s) 104 to progressively build one or more models that may be used find patterns and/or make predictions or decisions about production data 108. Typically, training data 106 is data of the same type as production data 108, although training data 106 may or may not include additional information, such as labels, that may not be included in production data 108. Training data 106 and/or production data 108 may be obtained from real-world situations using data acquisition device 110. Examples of such devices may include imaging devices, such as cameras, scanners, x-ray imaging devices, MRI devices CT devices, etc. to obtain image data. Likewise, examples may include devices for, fingerprint, retinal scan, palm vein, face recognition, DNA, palmprint, hand geometry, iris recognition, retina, and odor/scent, etc., to obtain biometric data. Further, examples may include historical data, such as details regarding loan requests, information about the request, about the person asking for the loan, about the status of the loan etc. Other examples may include sensor data, such as weight, water level, temperature, wind, movement etc. Other examples may include voice data, such as speech or music. Other examples may include various information about humans and about geography, such as census data and location data. Other examples may include natural language text, such as written or spoken language data, including, for example, news reports, scientific reports, conversation captures (written or spoken).

Statistical testing 112 may perform, for example, a non-parametric statistical test for the identity of two distributions, over the classifier confidence per each label. In embodiments, the distribution of the classifier confidence per label may be utilized. For example, the confidence-per-label distribution using training data 106 and in production data 108 (or over two different time windows in production) may be compared. Results data 114 may include data relating to the results of the statistical test performed by statistical test routines 112. For example, based on the results of the statistical test, the presences of data drift between training data 106 and in production data 108 (or over two different time windows in production) may be determined. Such statistical test may include, for example, Student's t-test and the Kolmogorov-Smirnov test (K-S test or KS test), or other similar tests.

Figure 2:
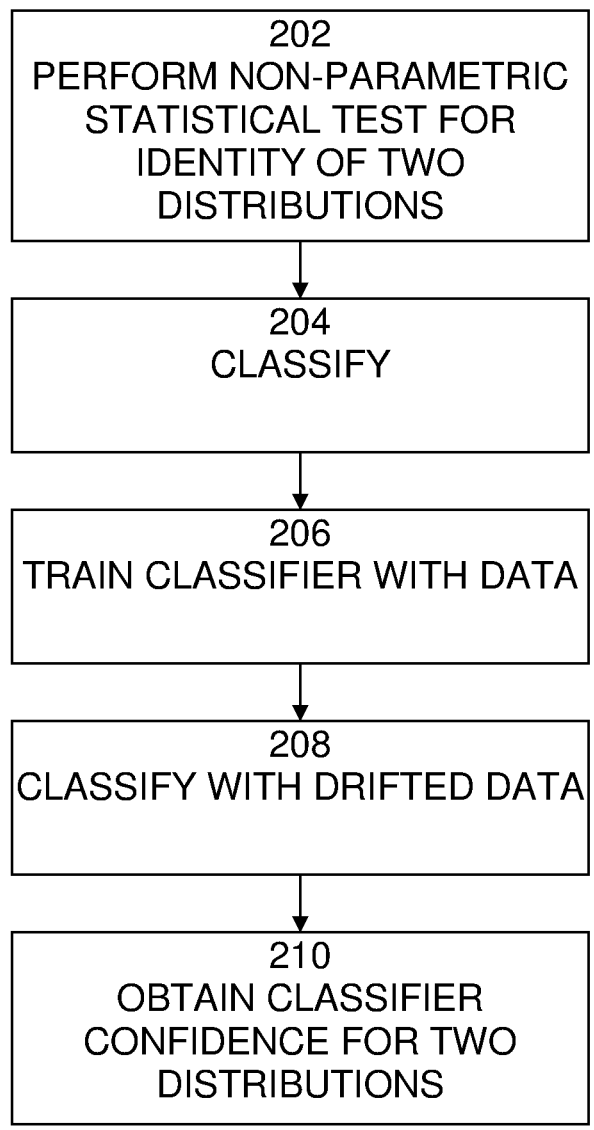
FIG. 2 is an exemplary flow diagram of a process, which may implement embodiments of the present methods, and which may be implemented in embodiments of the present systems.
Figure 3:
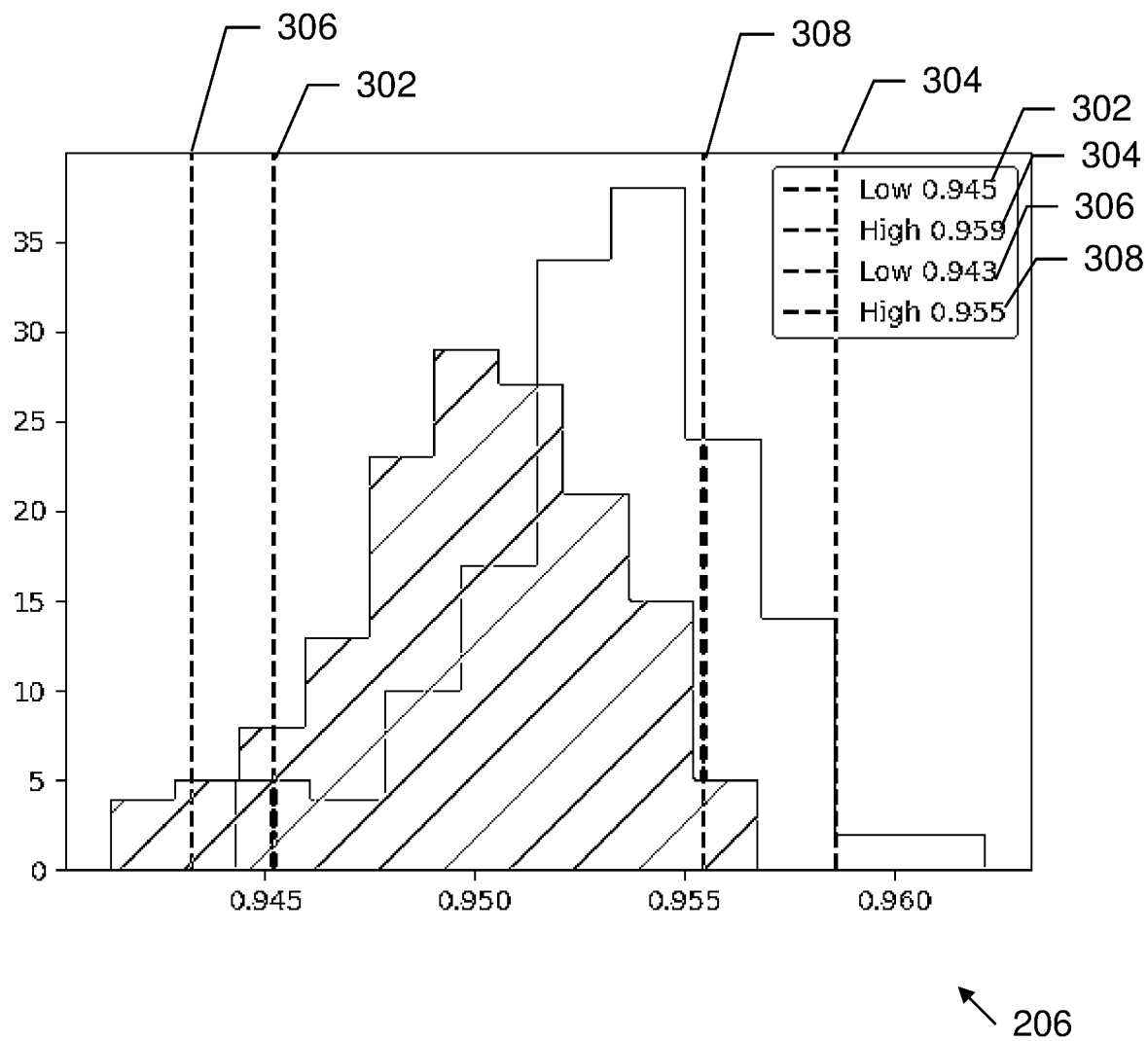
FIG. 3 shows exemplary results of the operation of embodiments of the present systems and methods.

An exemplary flow diagram of a process 200 of operation of system 100 is shown in FIG. 2. It is best viewed in conjunction with FIG. 1. In this example, process 200 begins with 202, in which a non-parametric statistical test for the identity of two distributions, over the classifier confidence per each label may be performed. For example, a two-sample two-tailed t-test, or any other non-parametric statistical test may be performed. Process 200 may determine if the distributions are significantly different. For example, see FIG. 3, which shows two distributions that are detected as different using the above-mentioned statistical tests. This is demonstrated over, for example, the Modified National Institute of Standards and Technology (MNIST) data, without drift (plain) and with drift (hatched). The dotted vertical lines show the confidence intervals for the trained classifier confidence in the winning label without 302, 304 and with 306, 308 drift. Included in the MNIST data are gray-scale images of digits from 0 to 9 (10 classes, one for each digit).

Figure 4:
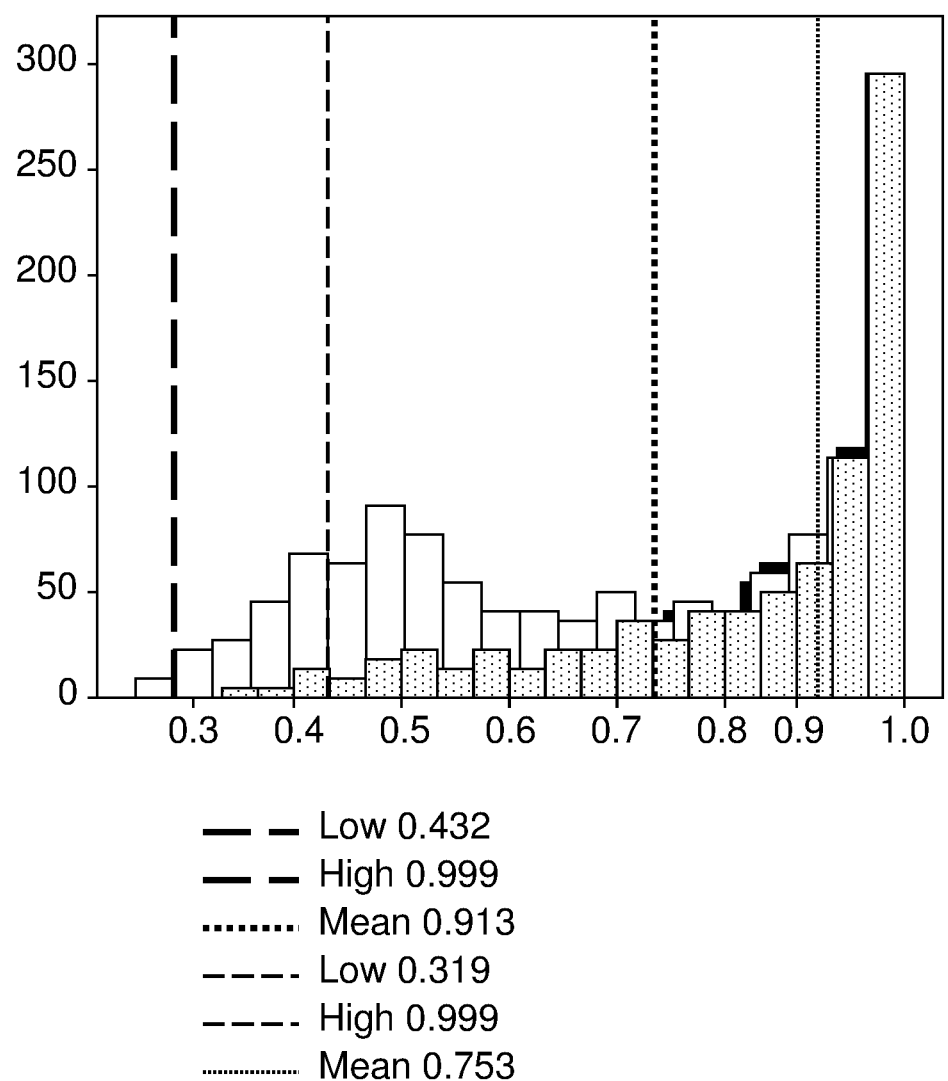
FIG. 4 shows exemplary results of the operation of embodiments of the present systems and methods.

At 204, the classifier task may be, for example, to classify an incoming image into one of the 10 digit classes. At 206, the classifier may be trained using modified or unmodified training data 106. For example, the classifier may be trained using training data 106 that does not include one of the digits, for example, without digit '3'. At 208, the classifier may be operated using production data 108 that is drifted from the training data 106. For example, using the MNIST dataset, production drift may be simulated by including the missing digit by adding images of digit '3' to be classified. At 210, the classifier confidence for the two distributions may be obtained. For example, FIG. 4 shows the confidence intervals over the classifier confidence for digit '8'. Black is the original data (without '3'), shaded is the 'production' data (with some images of digit '3' included). The statistical test (two-sample two-tailed t-test in this case) indicates significantly different distributions for the classifier confidence, for example for label/digit '8'.

Figure 5:
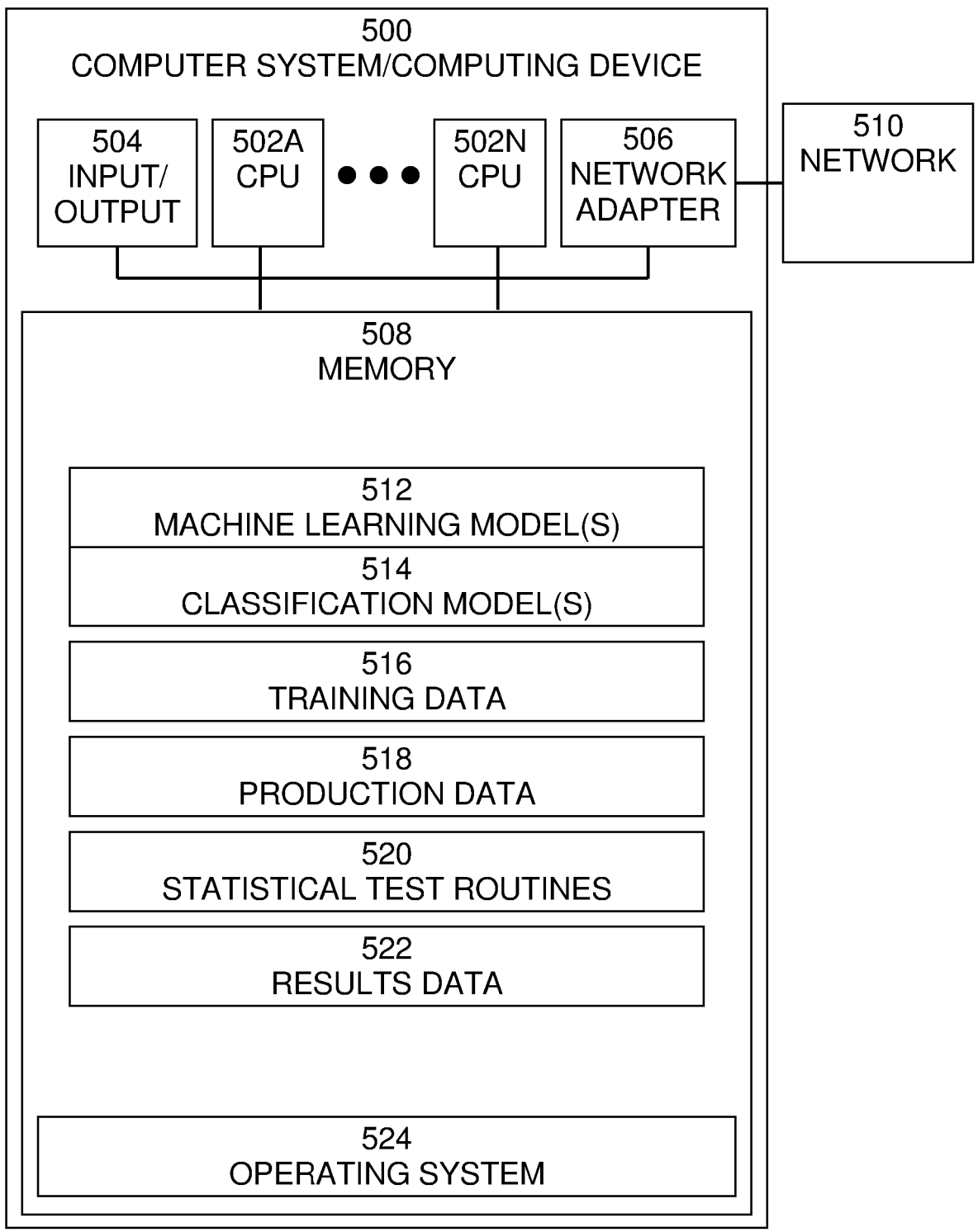
FIG. 5 is an exemplary block diagram of a computer system/computing device in which processes involved in the embodiments described herein may be implemented.

An exemplary block diagram of a computer system/computing device 502, in which processes involved in the embodiments described herein may be implemented, is shown in FIG. 5. Computer system/computing device 502 may be implemented using one or more programmed general-purpose computer systems, such as embedded processors, systems on a chip, personal computers, workstations, server systems, and minicomputers or mainframe computers, mobile devices, such as smartphones or tablets, or in distributed, networked computing environments. Computer system/computing device 502 may include one or more processors (CPUs) 502A-502N, input/output circuitry 504, network adapter 506, and memory 508. CPUs 502A-502N execute program instructions in order to carry out the functions of the present communications systems and methods. Typically, CPUs 502A-502N are one or more microprocessors, such as an INTEL CORE® processor or an ARM® processor. FIG. 5 illustrates an embodiment in which computer system/computing device 502 is implemented as a single multi-processor computer system/computing device, in which multiple processors 502A-502N share system resources, such as memory 508, input/output circuitry 504, and network adapter 506. However, the present communications systems and methods also include embodiments in which computer system/computing device 502 is implemented as a plurality of networked computer systems, which may be single-processor computer system/computing devices, multi-processor computer system/computing devices, or a mix thereof.

Input/output circuitry 504 provides the capability to input data to, or output data from, computer system/computing device 502. For example, input/output circuitry may include input devices, such as keyboards, mice, touchpads, trackballs, scanners, analog to digital converters, etc., output devices, such as video adapters, monitors, printers, biometric information acquisition devices, etc., and input/output devices, such as, modems, etc. Network adapter 506 interfaces device 500 with a network 510. Network 510 may be any public or proprietary LAN or WAN, including, but not limited to the Internet.

Memory 508 stores program instructions that are executed by, and data that are used and processed by, CPU 502 to perform the functions of computer system/computing device 502. Memory 508 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 508 may vary depending upon the function that computer system/computing device 502 is programmed to perform. In the example shown in FIG. 5, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 5, memory 508 may include machine learning model(s) 512, classification model(s) 514, training data 516, production data 518, statistical test routines 520, results data 522, and operating system 524. Machine learning model(s) 512 may include software routines, statistical models, and data that may be used to find patterns in, make predictions about, or make decisions about data. For example, in embodiments, machine learning model(s) 512 may include classification model(s) 514, which may classify data into one or more categories once trained. Training data 516 may include data that may be input to machine learning model(s) 512 and/or classification model(s) 514 to progressively build one or more models that may be used find patterns and/or make predictions or decisions about data. Production data 518 may include data that may be input to trained machine learning model(s) 512 and/or classification model(s) 514 during operation of the system to find patterns and/or make predictions or decisions about production data 518. Statistical test routines 520 may include software routines to perform, for example, a non-parametric statistical test for the identity of two distributions, over the classifier confidence per each label. Results data 520 may include data relating to the results of the statistical test performed by statistical test routines 520. Operating system 524 may provide overall system functionality.

As shown in FIG. 5, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method comprising:
   providing a non-binary machine learning classification model in a computer system comprising a processor, memory accessible by the processor, and computer program instructions stored in the memory and executable by the processor;
   operating, at the computer system, the non-binary machine learning classification model using a first dataset to obtain a plurality of labels of the first dataset;
   operating, at the computer system, the non-binary machine learning classification model using a second dataset to obtain a plurality of labels of the second dataset, wherein second data set simulates data drift relative to the first data set by the plurality of labels of the second data set having at least one more label than the plurality of labels of the first data set;
   performing, at the computer system, a non-parametric statistical test for identity, over a classifier confidence-per-label distribution for at least one label of the plurality of labels of the first dataset and of the second dataset to determine a difference in a resulting confidence-per-label distribution between the first dataset and of the second dataset;

determining, at the computer system, whether the second dataset has data drift relative to the first dataset based on the difference in the resulting confidence-per-label distribution between the first dataset and of the second dataset; and training the non-binary machine learning classification model based on the determination of whether data drift has occurred from the first data set to the second data set.

2. The method of claim 1, wherein the first dataset comprises at least a portion of a training dataset and the second dataset comprises as least a portion of a production dataset.

3. The method of claim 1, wherein the first dataset comprises a first portion of a production dataset and the second dataset comprises a second portion of the production dataset.

4. A system comprising a processor, memory accessible by the processor, and computer program instructions stored in the memory and executable by the processor to perform:

operating a non-binary machine learning classification model using a first dataset to obtain a plurality of labels of the first dataset;

operating the non-binary machine learning classification model using a second dataset to obtain a plurality of labels of the second dataset, wherein second data set simulates data drift relative to the first data set by the plurality of labels of the second data set having at least one more label than the plurality of labels of the first data set;

performing a non-parametric statistical test for identity, over a classifier confidence-per-label distribution for at least one label of the plurality of labels of the first dataset and of the second dataset to determine a difference in a resulting confidence-per-label distribution between the first dataset and of the second dataset;

determining whether the second dataset has data drift relative to the first dataset based on the difference in the resulting confidence-per-label distribution between the first dataset and of the second dataset; and training the non-binary machine learning classification model based on the determination of whether data drift has occurred from the first data set to the second data set.

5. The system of claim 4, wherein the first dataset comprises at least a portion of a training dataset and the second dataset comprises as least a portion of a production dataset.

6. The system of claim 4, wherein the first dataset comprises a first portion of a production dataset and the second dataset comprises a second portion of the production dataset.

7. A computer program product comprising a non-transitory computer readable storage having program instructions embodied therewith, the program instructions executable by a computer, to cause the computer to perform a method comprising:

operating a non-binary machine learning classification model using a first dataset to obtain a plurality of labels of the first dataset;

operating the non-binary machine learning classification model using a second dataset to obtain a plurality of labels of the second dataset, wherein second data set simulates data drift relative to the first data set by the plurality of labels of the second data set having at least one more label than the plurality of labels of the first data set;

performing a non-parametric statistical test for identity, over a classifier confidence-per-label distribution for at least one label of the plurality of labels of the first dataset and of the second dataset to determine a difference in a resulting confidence-per-label distribution between the first dataset and of the second dataset;

determining whether the second dataset has data drift relative to the first dataset based on the difference in the resulting confidence-per-label distribution between the first dataset and of the second dataset; and training the non-binary machine learning classification model based on the determination of whether data drift has occurred from the first data set to the second data set.

8. The computer program product of claim 7, wherein the first dataset comprises at least a portion of a training dataset and the second dataset comprises as least a portion of a production dataset.

9. The computer program product of claim 7, wherein the first dataset comprises a first portion of a production dataset and the second dataset comprises a second portion of the production dataset.

* * * * *